United States Patent
Zebec et al.

(10) Patent No.: US 9,488,052 B2
(45) Date of Patent: Nov. 8, 2016

(54) METHOD FOR RECONDITIONING A BLADE OF A GAS TURBINE AND ALSO A RECONDITIONED BLADE

(71) Applicant: ALSTOM Technology Ltd., Baden (CH)

(72) Inventors: Igor Zebec, Neuenhof (CH); Josip Stedul, Untersiggenthal (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 523 days.

(21) Appl. No.: 13/763,506

(22) Filed: Feb. 8, 2013

(65) Prior Publication Data

US 2013/0209270 A1     Aug. 15, 2013

(30) Foreign Application Priority Data

Feb. 10, 2012  (CH) .................... 00183/12

(51) Int. Cl.
| | |
|---|---|
| *F01D 5/12* | (2006.01) |
| *F01D 5/00* | (2006.01) |
| *B23P 6/00* | (2006.01) |

(52) U.S. Cl.
CPC .............. *F01D 5/005* (2013.01); *B23P 6/002* (2013.01); *F05D 2230/10* (2013.01); *F05D 2240/304* (2013.01); *Y10T 29/49318* (2015.01)

(58) Field of Classification Search
CPC ........ B23P 6/002; B23P 6/045; F01D 5/005; F01D 5/18; F05D 2240/304
See application file for complete search history.

(56) References Cited

U.S. PATENT DOCUMENTS

| | | | |
|---|---|---|---|
| 4,303,374 A * | 12/1981 | Braddy ................... | F01D 5/186 415/115 |
| 5,271,715 A | 12/1993 | Zelesky et al. | |
| 5,368,441 A | 11/1994 | Sylvestro et al. | |
| 6,551,063 B1 * | 4/2003 | Lee ........................ | F01D 5/18 416/224 |
| 6,754,955 B1 | 6/2004 | Carl, Jr. et al. | |
| 7,371,048 B2 * | 5/2008 | Downs .................... | F01D 5/186 416/97 R |
| 7,766,616 B2 * | 8/2010 | Baldauf et al. ............. | 416/97 R |
| 7,850,428 B2 * | 12/2010 | Tibbott et al. .............. | 416/97 R |
| 2002/0119730 A1 | 8/2002 | Dean et al. | |
| 2002/0141870 A1 * | 10/2002 | Schafrik ................. | F01D 5/187 416/97 R |

FOREIGN PATENT DOCUMENTS

| | | |
|---|---|---|
| EP | 1662090 A1 | 5/2006 |
| EP | 1826361 A2 | 8/2007 |

* cited by examiner

*Primary Examiner* — Richard Edgar
(74) *Attorney, Agent, or Firm* — Buchanan Ingersoll & Rooney PC

(57) ABSTRACT

A method is provided for reconditioning a blade of a gas turbine. The blade includes a blade airfoil, with a pressure side and a suction side, which extends in the blade longitudinal direction between a platform and a blade tip, and has a leading edge and a trailing edge, and is outwardly delimited by a pressure-side wall and a suction-side wall which converge at the trailing edge of the blade airfoil, forming discharge openings for cooling air which are arranged in a distributed manner along the trailing edge between the walls.

12 Claims, 5 Drawing Sheets

METHOD FOR RECONDITIONING A BLADE OF A GAS TURBINE AND ALSO A RECONDITIONED BLADE

INCORPORATION BY REFERENCE

The following documents are incorporated herein by reference as if fully set forth: Swiss Patent Application No. 00183/12, filed Feb. 10, 2012.

FIELD OF THE INVENTION

The present invention relates to the field of gas turbines. It refers to a method for reconditioning a blade of a gas turbine and to a reconditioned blade of a gas turbine.

BACKGROUND

Turbine blades, in which the trailing edge of the pressure-side blade wall is cut back at the outset during production compared with the trailing edge of the suction-side blade wall, are known from the prior art (see, for example, U.S. Pat. No. 5,271,715, which is incorporated herein by reference). As a result of this, an end of the blade airfoil which is as thin as possible at the trailing edge is to be realized in the case of a cooled blade. This design has nothing to do with a reconditioning.

It is also known (U.S. Pat. No. 6,754,955, which is incorporated herein by reference), for the repair of the trailing edges of turbine blades, to at least partially remove the trailing edge by means of EDM (electrical discharge machining) and to replace the removed parts by filling up with material. Such a reconditioning is very time-consuming and therefore associated with comparatively high costs.

Finally, for the repair of turbine rotor blades in damaged sections, it is known (U.S. Patent Application Publication No. 2002/0119730, which is incorporated herein by reference) to completely cut away the trailing edge, i.e. both on the suction side and on the pressure side. As a result of this, the blade profile is significantly altered.

SUMMARY

The present disclosure is directed to a method for reconditioning a blade of a gas turbine. The blade includes a blade airfoil, with a pressure side and a suction side, which extends in a blade longitudinal direction between a platform and a blade tip. The blade having a leading edge and a trailing edge, and is outwardly delimited by a pressure-side wall and a suction-side wall which converge at the trailing edge of the blade airfoil, forming discharge openings for cooling air which are arranged in a distributed manner along the trailing edge between the walls. The method includes introducing a cutout into the pressure-side wall along the trailing edge, and starting from the trailing edge, in such a way that the trailing-side edge of the pressure-side wall is cut back compared with the trailing-side edge of the suction-side wall.

The present disclosure is also directed to a blade of a gas turbine. The blade includes a blade airfoil, with a pressure side and a suction side, which extends in a blade longitudinal direction between a platform and a blade tip, has a leading edge and a trailing edge, and is outwardly delimited by a pressure-side wall and a suction-side wall which converge at the trailing edge of the blade airfoil, forming discharge openings for cooling air. The discharge openings are arranged in a distributed manner along the trailing edge between the walls. A cutout is formed into the pressure-side wall along the trailing edge, and starting from said trailing edge, in such a way that the trailing-side edge of the pressure-side wall is cut back compared with the trailing-side edge of the suction-side wall.

BRIEF EXPLANATION OF THE FIGURES

The following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENTS

Introduction to the Embodiments

Figures 1, 1A:
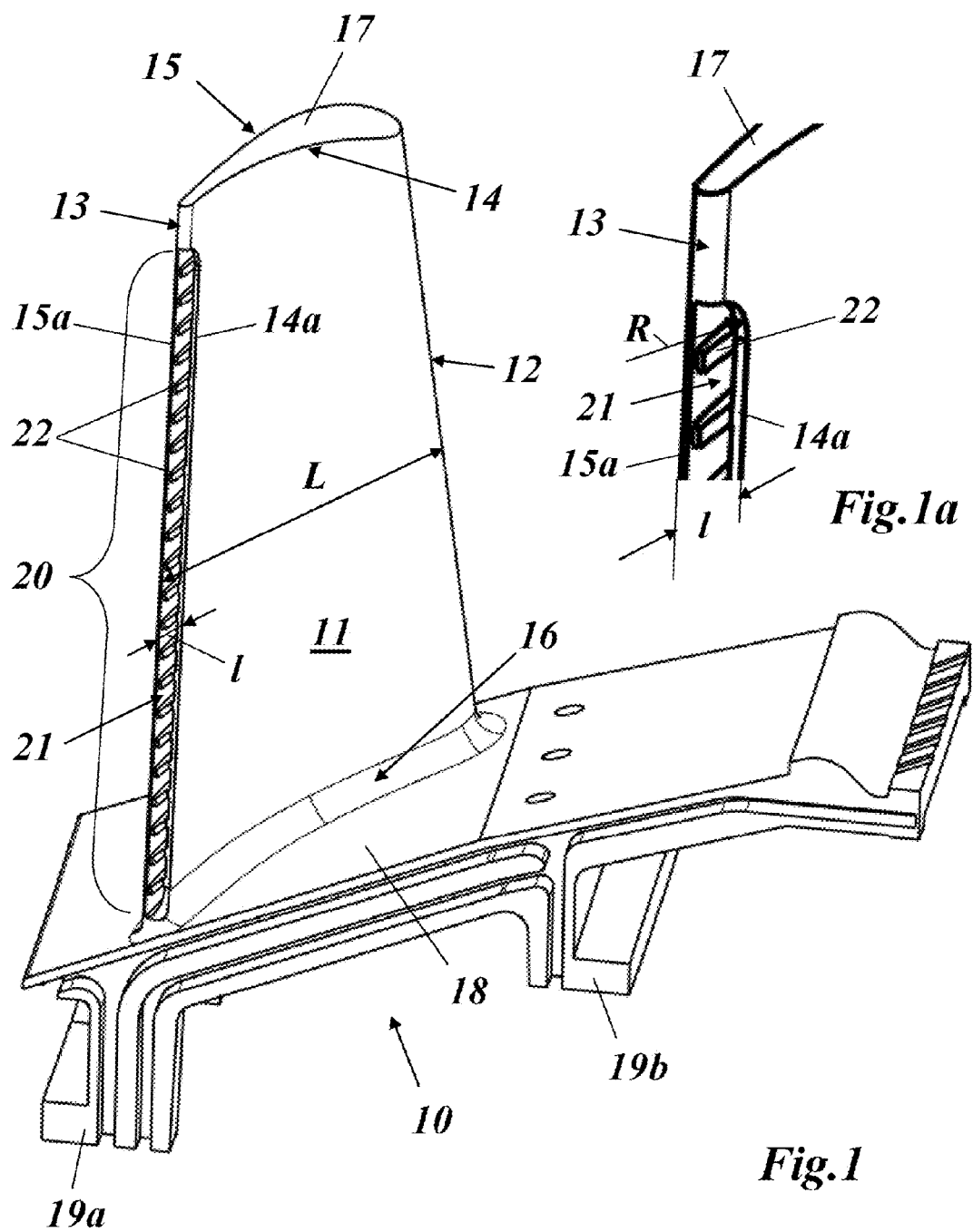
FIG. 1 shows an exemplary embodiment of a reconditioned gas turbine blade according to the invention with a pressure-side cutout introduced at the trailing edge.
FIG. 1a shows an enlarged view of the upper section of the cutout from FIG. 1.

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof.

It is therefore the object of the invention to disclose a method for reconditioning a turbine blade which avoids the disadvantages of known methods and is simpler to implement and more flexible to apply.

It is also an object of the invention to disclose a correspondingly reconditioned blade.

These and other objects are achieved by means of the sum total of the features of the appended claims.

The method according to the invention for reconditioning a blade of a gas turbine is based on a blade which comprises a blade airfoil, with a pressure side and a suction side, which extends in the blade longitudinal direction between a platform and a blade tip, has a leading edge and a trailing edge, and is outwardly delimited by a pressure-side wall and a suction-side wall which converge at the trailing edge of the blade airfoil, forming discharge openings for cooling air which are arranged in a distributed manner along the trailing edge between the walls. A cutout is introduced into the pressure-side wall along the trailing edge, and starting from said trailing edge, in such a way that the trailing-side edge of the pressure-side wall is cut back compared with the trailing-side edge of the suction-side wall. As a result of the cutting away of only one wall, the blade airfoil remains comparatively unaltered. At the same time, the possibility exists of machining (repairing) the exposed parts of the other wall from both sides (outer and inner). Finally, intervention into the cooling system at the trailing edge is comparatively limited and can be further lessened if need be by inserting a throttling element into the cutout.

In one embodiment of the method according to the invention, the trailing-side edge of the pressure-side wall is cut back by a predetermined depth compared with the trailing-side edge of the pressure-side wall.

The blade airfoil particularly has a predetermined chord length, and the depth of the cutout is at most 15% of the chord length.

The depth of the cutout is preferably between 7% and 9.5% of the chord length.

In another embodiment of the invention, the wall thickness of the pressure-side wall reduces towards the trailing edge, and the depth of the cutout is selected so that the thickness of the edge of the pressure-side wall which delimits the cutout is at most twice the size of the thickness of the original edge of the pressure-side wall.

In a further embodiment of the invention, the width of the discharge openings reduces towards the trailing edge, and the depth of the cutout is selected so that the ratio of the cross-sectional areas of the discharge openings after the introduction of the cutout to the cross-sectional areas of the discharge openings before the introduction of the cutout is between 0.5 and 2.

In a still further embodiment of the invention, the trailing edge has a straight section between blade tip and platform, and the cutout extends over the straight section of the trailing edge.

In a further embodiment of the invention, the cutout is rounded on the blade tip-side end and/or on the platform-side end.

In yet another embodiment of the invention, the trailing-side edge of the pressure-side wall is cut back by a predetermined depth compared with the trailing-side edge of the suction-side wall, and the roundings have a radius which is less than, or equal to, the depth of the cutout.

It is also advantageous if for adjusting the cross-sectional areas of the discharge openings a throttle plate, which limits the width of the discharge openings, is inserted into the cutout. The throttle plate is preferably welded to the pressure-side wall.

In another embodiment of the invention, after the introduction of the cutout the exposed surfaces are provided with a coating. The coating can especially be a metal coating. The coating, however, can also be an anti-oxidation coating or a bond coating.

In another embodiment of the invention, after the introduction of the cutout the suction-side wall is machined from the exposed inner side.

According to yet another embodiment of the invention, electrical discharge machining is used for the introduction of the cutout.

In one more embodiment of the invention, the blade is a stator blade.

The blade according to the invention comprises a blade airfoil, with a pressure side and a suction side, which extends in the blade longitudinal direction between a platform and a blade tip, has a leading edge and a trailing edge, and is outwardly delimited by a pressure-side wall and a suction-side wall which converge at the trailing edge of the blade airfoil, forming discharge openings for cooling air which are arranged in a distributed manner along the trailing edge between the walls. Within the scope of a reconditioning, a cutout is introduced into the pressure-side wall along the trailing edge, and starting from said trailing edge, in such a way that the trailing-side edge of the pressure-side wall is cut back compared with the trailing-side edge of the suction-side wall.

In one embodiment of the blade according to the invention, the trailing-side edge of the pressure-side wall is cut back by a predetermined depth compared with the trailing-side edge of the suction-side wall.

In another embodiment of the blade according to the invention, the blade airfoil has a predetermined chord length, and the depth of the cutout is at most 15% of the chord length. In particular, the depth of the cutout is between 7% and 9.5% of the chord length.

According to another embodiment of the blade according to the invention, the cutout is rounded on the blade tip-side end and/or on the platform-side end.

In a further embodiment of the blade according to the invention, the trailing-side edge of the pressure-side wall is cut back by a predetermined depth compared with the trailing-side edge of the suction-side wall, and the roundings have a radius which is less than, or equal to, the depth of the cutout.

DETAILED DESCRIPTION

Shown in FIG. 1 is an exemplary blade 10 of a gas turbine, which is reconditioned according to an exemplary embodiment of the invention. The blade 10 has a blade airfoil 11 which extends in the longitudinal direction from a platform 18 to a blade tip 17. The blade airfoil 11 has a pressure side 14 and a suction side 15 and also a leading edge 12 and a trailing edge 13. The platform 18 is provided with hook-like fastening elements 19a and 19b on the underside. The blade airfoil 11 merges into the platform 18 at a root 16.

At the trailing edge 13, discharge openings 21 for cooling air are arranged in a distributed manner along said trailing edge 13 and are separated from each other by means of ribs 22 disposed in between. The blade airfoil 11 is outwardly delimited by a pressure-side wall 14a and a suction-side wall 15a which, in the non-reconditioned state, converge at the trailing edge 13, forming the ribs 22 and discharge openings 21, as is to be seen in FIGS. 4 and 5 of printed publication US 2002/0119730 A1 which is referred to in the introduction.

Figure 2:
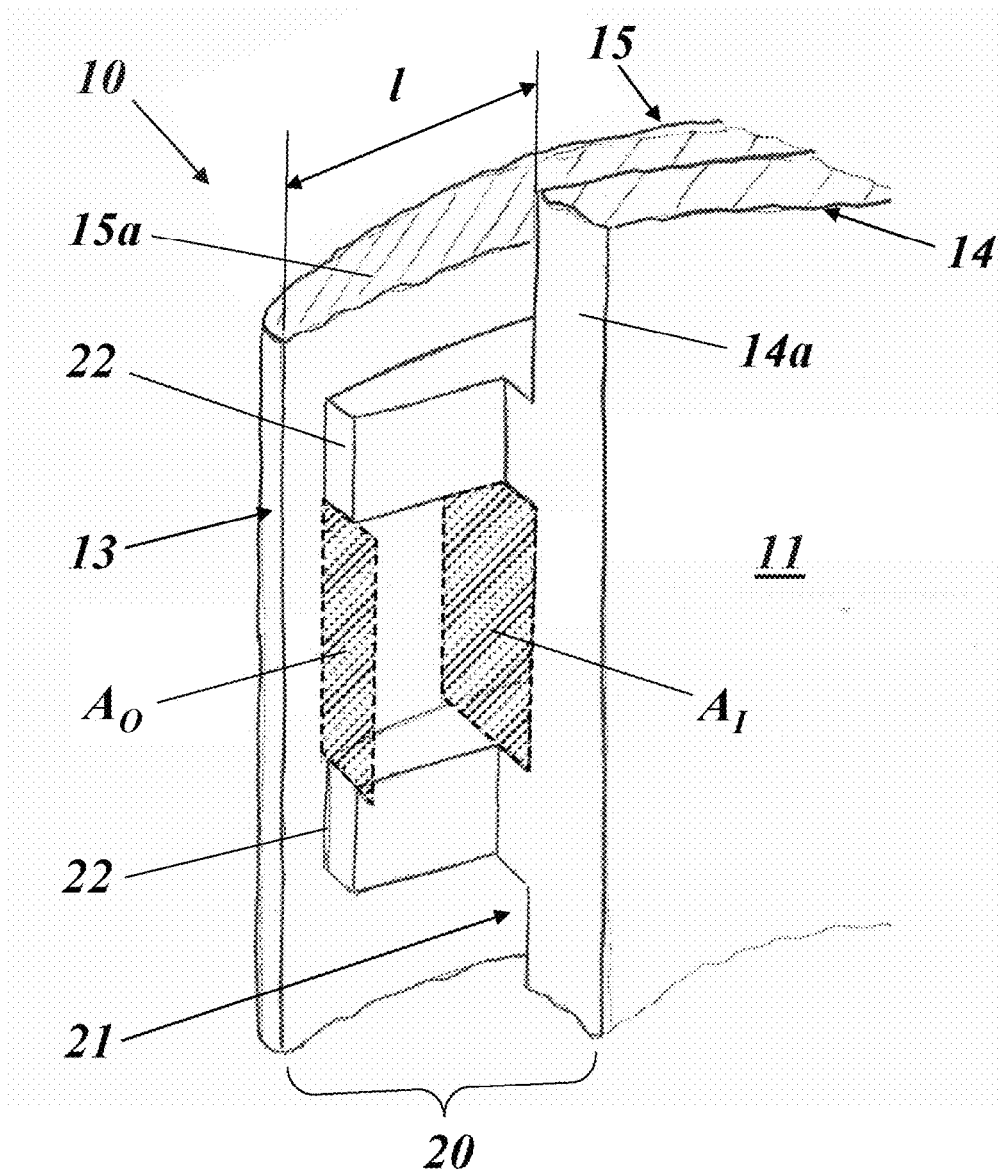
FIG. 2 shows the change of the cross-sectional areas of the discharge openings at the trailing edge as a result of the introduced cutout.

In the reconditioned state, as is shown in FIG. 1, a cutout 20, which extends along the trailing edge 13, is introduced into said trailing edge 13 of the blade 10 and is produced by the cutting away of the trailing edge of the suction-side wall 14a to a depth l (see FIGS. 1a and 2). The trailing-side edge of the pressure-side wall 14a is therefore cut back by the depth l compared with the trailing-side edge of the suction-side wall 15a.

If the blade airfoil 11 has a predetermined chord length L, the depth l of the cutout 20 is at most 15% of the chord length L (FIG. 1). The depth l of the cutout 20 preferably constitutes between 7% and 9.5% of the chord length L. An exemplary value for the dimension is 7 mm.

The cutout 20 in the pressure-side wall 14a is limited to the smooth or straight trailing edge of the profile, i.e. between root 16 and blade tip 17. The blade tip 17 of the possible profile is typically solidly formed. Also, in the case of a blade (not shown) with a crown or shroud the cutout 20 should run out before this.

As can be seen in the enlarged view of FIG. 1a, the cutout 20 is rounded on the blade tip-side end and/or on the platform-side end. The roundings advantageously have in this case a radius R which is smaller than, or equal to, the depth l of the cutout 20.

As clearly seen in FIGS. 2-5, the discharge openings 21 taper towards the trailing edge 13. According to FIG. 2, as a result of introducing the cutout 20, the cross-sectional area of the discharge openings 21 increases from the original value $A_O$ to the new value $A_I$. In the depicted example, the new value is approximately $A_I = 1.45 A_O$. In general, it can be said that the depth l of the cutout 20 has to be selected so that the ratio of the cross-sectional areas $A_I$ of the discharge openings 21 after the introduction of the cutout 20 to the cross-sectional areas $A_O$ of the discharge openings 21 before the introduction of the cutout 20 is between 0.5 and 2.

Figure 3:
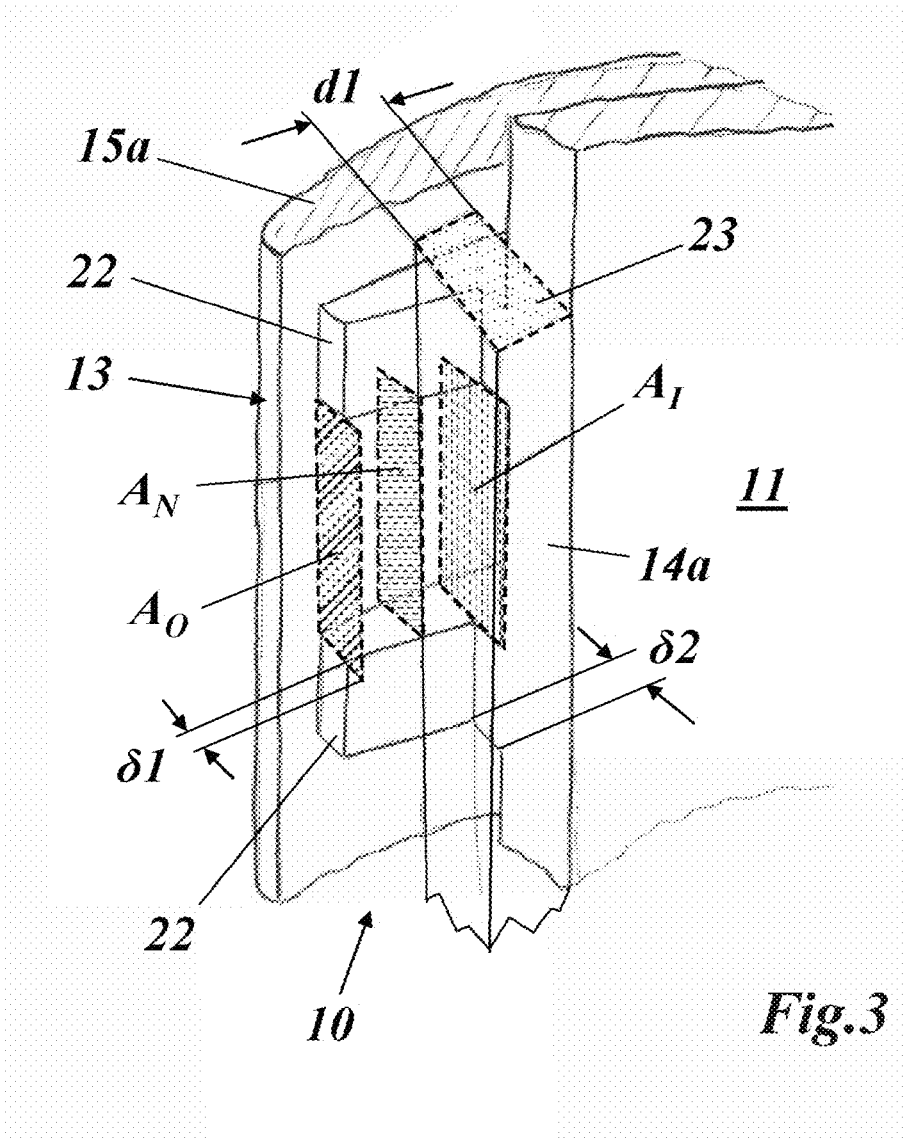
FIG. 3 shows the adjustment of the cross-sectional areas of the discharge openings as a result of inserting a throttle plate into the cutout.
Figure 4:
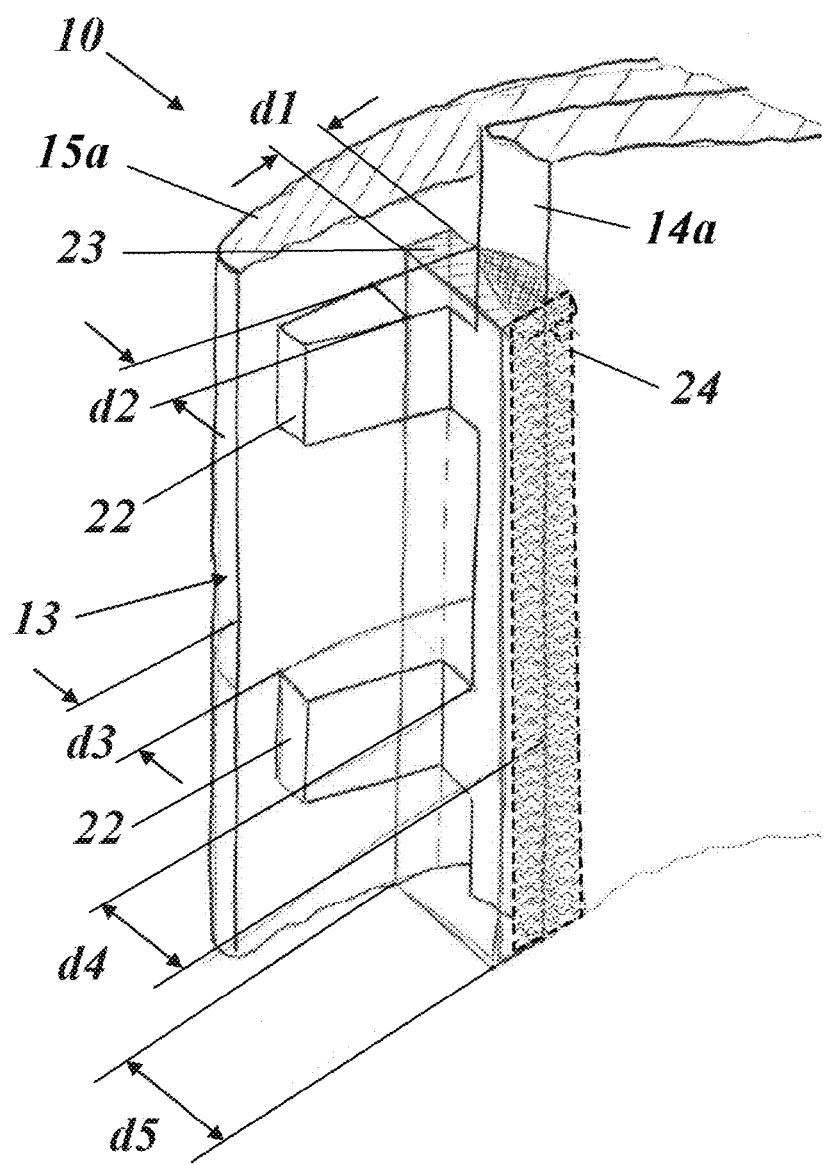
FIG. 4 shows the fastening of the throttle plate from FIG. 3 by welding to the pressure-side wall.

If, however, despite the cutout 20, the cross-sectional area is to approximately maintain the original value $A_O$, according to FIG. 3 or 4 a throttle plate 23 with the thickness d1 can be attached in the cutout 20 in such a way that the result is an effective cross-sectional area $A_N$ which is approximately of the same size as $A_O$. To this end, the ribs 22 must be cut down to a distance of $\delta 1$ and $\delta 2$. According to FIG. 4, the ribs 22 on the rear side of the throttle plate 23 then have the thickness d2, the thickness of the pressure-side wall 14a at the edge of the cutout 20 is d4, the thickness of the suction-side wall 15a at the end of the ribs is d3, and the thickness of the throttle plate is d5. The throttle plate 23 is connected to the pressure-side wall 14a via a welded seam 24.

Dimension examples of the values are:

| | |
|---|---|
| d1 | 2 mm |
| d2 | 1.5 mm |
| d3 | 1.25 mm |
| d4 | 1.48 mm |
| d5 | 3 mm. |

Another limitation results from the fact that the wall thickness of the pressure-side wall 14a reduces towards the trailing edge 13. The depth l of the cutout 20 should be selected in this case so that the thickness d4 of the edge of the pressure-side wall 14a which delimits the cutout 20 is at most twice the size of the thickness of the original edge of the pressure-side wall 14a.

Figure 5:
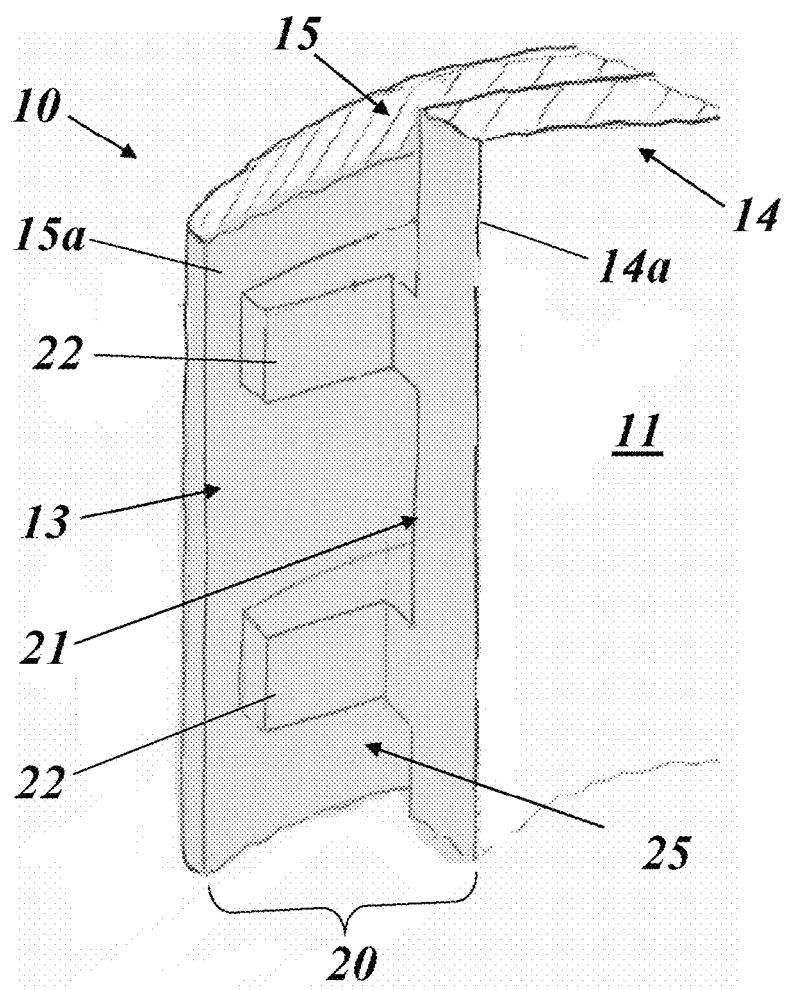
FIG. 5 shows the coating of the surfaces of the blade which are exposed as a result of the cutout.

According to FIG. 5, the surfaces which are exposed as a result of the cutout 20 can be provided with a coating 25. An example of a possible coating 25 is a metal coating of the SH20 type. Also, conventional anti-oxidation coatings or "bond coats" are conceivable as coatings 25.

A particular advantage of the described reconditioning is that after the introduction of the cutout 20 the remaining trailing edge of the suction-side wall 15a is accessible from both sides for repair (for welding) so that much deeper cracks can even be repaired.

The described reconditioning is primarily intended for stator blades.

The cutout ("cutback") 20 can alter the natural oscillations of the blade 10, which is problematical in the case of rotor blades. In the worst case, the natural frequency of the rotor of the gas turbine can also shift. The insertion of the throttle plate 23 (FIGS. 3, 4) or the application of the coating 25 (FIG. 5) can be used in the sense of a frequency tuning for rotor blades in order to reacquire the original natural frequency.

For the introduction of the cutout 20 into the pressure-side wall 14a, electrical discharge machining (EDM) is preferably used.

The references cited throughout this application are incorporated for all purposes apparent herein and in the references themselves as if each reference was fully set forth. For the sake of presentation, specific ones of these references are cited at particular locations herein. A citation of a reference at a particular location indicates a manner(s) in which the teachings of the reference are incorporated. However, a citation of a reference at a particular location does not limit the manner in which all of the teachings of the cited reference are incorporated for all purposes.

It is understood, therefore, that this invention is not limited to the particular embodiments disclosed, but is intended to cover all modifications which are within the spirit and scope of the invention as defined by the appended claims; the above description; and/or shown in the attached drawings.

LIST OF DESIGNATIONS

10 Blade
11 Blade airfoil
12 Leading edge
13 Trailing edge
14 Pressure side
14a Pressure-side wall
15 Suction side
15a Suction-side wall
16 Root
17 Blade tip
18 Platform
19a, b Fastening element (hook-like)
20 Cutout
21 Discharge opening
22 Rib
23 Throttle plate
24 Welded seam
25 Coating
$A_O$, $A_N$, $A_I$ Cross-sectional area
l Depth
L Chord length
$\delta 1$, $\delta 2$ Distance
d1-d5 Thickness
R Radius

The invention claimed is:

1. A method for reconditioning a blade of a gas turbine, the blade comprising a blade airfoil, with a pressure-side and a suction-side, which extends in a blade longitudinal direction between a platform and a blade tip, the blade having a leading edge and a trailing edge, and is outwardly delimited by a pressure-side wall and a suction-side suction-side wall which converge at the trailing edge of the blade airfoil, and ribs arranged between the pressure-side wall and the suction-side wall forming discharge openings for cooling air which are arranged in a distributed manner along the trailing edge between the walls, the method comprising:

removing a portion of the pressure-side wall and a portion of the ribs by introducing a cutout into the pressure-side wall along the trailing edge, and starting from said trailing edge, in such a way that the trailing-side edge of the pressure-side wall is cut back compared with the trailing-side edge of the suction-side wall, and a terminal portion of the ribs proximate the trailing-side edge are cut back,
wherein a width of the discharge openings reduces towards the trailing edge, and a depth of the cutout is selected so that the ratio of a cross-sectional area of the discharge openings after the introduction of the cutout to a cross-sectional area of the discharge openings before the introduction of the cutout is greater than 1 and less than or equal to 2.

2. The method as claimed in claim 1, wherein the blade airfoil has a predetermined chord length, and a depth of the cutout is at most 15% of the chord length.

3. The method as claimed in claim 1, wherein a wall thickness of the pressure-side wall reduces towards the trailing edge, and the depth of the cutout is selected so that a thickness of the edge of the pressure-side wall which delimits the cutout is at most twice the size of a thickness of the original edge of the pressure-side wall.

4. The method as claimed in claim 1, wherein the trailing edge has a straight section between blade tip and platform, and the cutout extends over the straight section of the trailing edge.

5. The method as claimed in claim 4, comprising:
inserting a throttle plate into the cutout to adjust the cross-sectional areas of the discharge openings to limit the width of the discharge openings.

6. The method as claimed in claim 1, comprising:
coating resulting exposed surfaces after the introduction of the cutout.

7. The method as claimed in claim 6, wherein the coating comprises:
a metal coating, an anti-oxidation coating or a bond coating.

8. The method as claimed in claim 1, comprising:
machining a resulting exposed inner side of the suction-side wall after the introduction of the cutout.

9. The method as claimed in claim 1, wherein an electrical discharge machining is used for the introduction of the cutout.

10. A blade of a gas turbine, the blade comprising:
a blade airfoil, with a pressure-side and a suction-side, which extends in a blade longitudinal direction between a platform and a blade tip, has a leading edge and a trailing edge, and is outwardly delimited by a pressure-side wall and a suction-side wall, discharge openings for cooling air arranged in a distributed manner between the pressure-side wall and the suction-side wall and located at a terminal end of pressure-side wall proximate the trailing edge, wherein a cutout is formed into the pressure-side wall along the trailing edge, and starting from said trailing edge, in such a way that the trailing-side edge of the pressure-side wall is cut back compared with the trailing-side edge of the suction-side wall and a throttle plate inserted into the cutout, the throttle plate reducing cross-sectional areas of the discharge openings at the terminal end of the pressure-side wall.

11. The blade as claimed in claim 10, wherein the throttle plate is welded to the pressure-side wall.

12. The method as claimed in claim 10, wherein the blade airfoil has a predetermined chord length, and a depth of the cutout is at most 15% of the chord length.

* * * * *